(12) United States Patent
Aziz et al.

(10) Patent No.: US 7,579,718 B2
(45) Date of Patent: Aug. 25, 2009

(54) FRONT ACCESS POWER LANDING DESIGN

(75) Inventors: Farid Aziz, Kanata (CA); Edmund Gillespie, Kanata (CA); Michele Low, Nepean (CA); Donald Lentz, Ashton (CA); Marko Nicolici, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1406 days.

(21) Appl. No.: 10/864,198

(22) Filed: Jun. 9, 2004

(65) Prior Publication Data

US 2005/0276384 A1  Dec. 15, 2005

(51) Int. Cl.
*H02G 1/14* (2006.01)
(52) U.S. Cl. ......................................... 307/147; 174/50
(58) Field of Classification Search ................. 307/147; 174/50
See application file for complete search history.

(56) References Cited

U.S. PATENT DOCUMENTS

| | | |
|---|---|---|
| 3,886,654 A | 6/1975 | Erdle |
| 3,924,161 A | 12/1975 | Olashaw et al. |
| 6,482,049 B1 | 11/2002 | Swearingen |
| 6,519,145 B1 | 2/2003 | Biran et al. |
| 6,836,030 B2 * | 12/2004 | Smith et al. .................. 307/147 |
| 6,967,283 B2 * | 11/2005 | Rasmussen et al. ........... 174/50 |
| 7,469,981 B2 * | 12/2008 | Katsuyama et al. ............ 347/1 |

FOREIGN PATENT DOCUMENTS

FR          2651386 A   *   3/1991

* cited by examiner

*Primary Examiner*—Albert W Paladini
(74) *Attorney, Agent, or Firm*—Ridout & Maybee LLP

(57) ABSTRACT

Disclosed is an apparatus and method for connecting a power feeder cable at a point for convenient operator access to an electrical subsystem located inside of a telecom equipment assembly. According to one embodiment, the terminal connection of the power feeder cable to the power entry point is positioned so as to be conveniently accessible to an operator from the telecom equipment aisle. According to another embodiment, a linking bus structure comprising, a first connector, a conducting path and a second connector, is mounted inside the telecom equipment assembly with the first connector positioned at the front panel of the telecom equipment assembly and conveniently accessible to an operator from the telecom equipment aisle. The apparatus and method are useful for overcoming difficulties normally encountered during inspection and maintenance of the connection of the power feeder cable at its terminal connection in a telecom equipment assembly.

15 Claims, 5 Drawing Sheets

FRONT ACCESS POWER LANDING DESIGN

FIELD OF THE INVENTION

The present invention relates to electrical connectors, and more particularly, to positioning of electrical power connectors for convenient access and maintenance.

BACKGROUND OF THE INVENTION

A telecom equipment assembly is typically housed in a telecom equipment rack located within a telecom equipment room. Such a room typically contains rows of telecom equipment racks. These rows of telecom equipment racks define telecom equipment aisles.

Telecom equipment assemblies house electrical subsystems containing among other things, power supplies, which, for the most part, operate on relatively low voltage direct current (DC) electrical power in the range of zero to 60 volt DC power. Electrical power is supplied along heavy-duty large-diameter copper cables from battery equipment located in a battery room or plant or within telecom equipment racks themselves at a nominal 48 volts to the telecom equipment assemblies located in the telecom equipment room. The battery equipment under some circumstances functions as a power reservoir for the telecom equipment assemblies. The cables ("power feeder cables") connecting the battery room to the telecom equipment assemblies within the telecom equipment room must be capable of conducting low voltage, high amperage, DC power with minimal resistance. The power feeder cables are typically run along overhead or in-floor troughs situated within corridors between the battery room and the telecom equipment rooms.

The power feeder cable normally terminates inside the telecom equipment assembly at a power entry point, which may be a terminal strip, bus bar or similar connection apparatus. The bus bar directs the electrical power to a power distribution module or to a breaker interface panel, and sometimes to a power converter.

The connection between the power feeder cable and the power entry point is often made through the use of a flat connector having a large surface area. The connection may be secured with a nut-and-lug type fastener. Over time, however, the contact between the power feeder cable and the power entry point begins to deteriorate as the nut begins to loosen due to heating of the contact through the interaction of electricity flowing through the cable and electrical resistance between the contact. Such heating results in the expansion of the components forming the contacts and ultimately loosening of the connection. If unchecked the loosening of the connection could result in power loss, or even scorching of the contacts. To prevent these consequences the connections must be inspected regularly and, if necessary, tightened by an operator.

This arrangement is well known in the art. However, a shortcoming in the existing art is that the connection between the power feeder cable and the power entry point is located inside of or at the rear of the telecom equipment assembly preventing convenient access to the connection. U.S. Pat. No. 3,924,161 to Olashaw et al. dated Dec. 2, 1975 is an example of an electrical switchboard having high voltage connections located at the back of the assembly. An operator typically must bring a step ladder into the equipment aisle and use it to gain entry to the inside of or the rear of a telecom equipment assembly in order to accomplish the task of inspecting and/or tightening the bolts thereby securing the connection between the power feeder cable and bus bar. This procedure is time consuming and presents potential hazards to the operator and the telecom equipment assembly itself.

In view of the foregoing, it would be desirable to provide a technique for connection of power feeder cables, which overcomes the above-described inadequacies and shortcomings.

SUMMARY OF THE INVENTION

The present invention improves access to the terminal connection of a power feeder cable at a power entry point to the telecom equipment assembly by positioning the connection to a more readily accessible location such as a side of the telecom equipment assembly that borders an equipment aisle or the front of the telecom equipment assembly.

According to a first aspect of the present invention there is disclosed an embodiment of a method for electrically linking at least one power feeder cable to an electrical subsystem located inside a telecom equipment assembly. The method comprises the steps of providing a power landing proximate to a side bordering an equipment aisle at a position so that an operator can conveniently access the power landing from the equipment aisle, electrically linking the power feeder cable to the power landing, and electrically linking the power landing to the electrical subsystem.

Advantageously the power landing may be situated behind a protective cover in order to prevent electrical faults or injury to an operator working in the equipment aisle.

Conveniently under some circumstances it may be useful to mount the power landing at a location on the telecom equipment assembly that is lower than about 2 meters from floor level of the equipment aisle.

Also advantageous in some circumstances is the use of a power landing which comprises a connector having at least one lug. The lug is capable of accepting a nut. Such a power landing is intended to function with a complementary connector capable of admitting the lug. The connection between this complementary connector and the power landing is then secured by engaging the lug with the nut.

According to another aspect of the present invention there is disclosed an embodiment of a telecom equipment assembly for installation along an equipment aisle. This embodiment comprises a power landing, an electrical subsystem located inside the telecom equipment assembly, and a conducting path electrically linking the power landing and the electrical subsystem. According to this embodiment, the telecom equipment assembly has a side portion that borders the equipment aisle. The power landing is located at a position relative to the telecom equipment assembly that is proximate to this side portion so that an operator can conveniently access the power landing from the equipment aisle.

Advantageously the power landing may be situated behind a protective cover in order to prevent electrical faults or injury to an operator working in the equipment aisle.

Conveniently under some circumstances it may be useful to position the power landing at a location on the telecom equipment assembly that is lower than about 2 meters from floor level of the equipment aisle.

Also convenient under some circumstances is the use of a bus bar as the conducting path in order to electrically link the power landing and the electrical subsystem.

Also advantageous is the use of a power landing which comprises a connector having at least one lug. The lug is capable of accepting a nut. Such a power landing is intended to function with a complementary connector capable of admitting the lug. The connection between this complementary connector and the power landing is then secured by engaging the lug with the nut.

According to yet another aspect of the present invention there is disclosed an embodiment of a linking bus structure for electrically linking at least one power feeder cable to an electrical subsystem located inside a telecom equipment assembly. The linking bus structure comprises: at least one first connector for electrically connecting the at least one power feeder cable, at least one second connector for electrically connecting the electrical subsystem, and at least one conducting path electrically linking the first and second connectors. According to this embodiment, the telecom equipment assembly has a side portion that borders the equipment aisle. The linking bus structure is positioned with the first connector proximate to this side portion so that an operator can conveniently access the first connector from the equipment aisle.

Advantageously the first connector may comprise a connector having at least one lug. The lug is capable of accepting a nut. Such a first connector is intended to function with a complementary connector capable of admitting the lug. The connection between this complementary connector and the first connector is then secured by engaging the lug with the nut.

Conveniently under some circumstances it may be useful to use an L-shaped connector having a surface complementary to the first connector and an end adapted to admit the power feeder cable. The connection between the L-shaped connector and the first connector is secured by engaging the lug with the nut. The end of the L-shaped connector is intended to attach to the power feeder cable.

Advantageously the conducting path used to electrically link the first and second connectors may be a first bus bar.

As yet another advantage the linking bus structure may further comprise an L-shaped support member defined by an arm and a post joined together at right angles, the L-shaped support member having a first end being an end of the arm opposite the joint, and a second end, being an end of the post opposite the joint. The L-shaped support member is adapted to attach the first connector at the first end and the second connector at the second end. Electrically linking the first connector to the second connector is a first bus bar. This bus bar is routed along the arm and the post.

Conveniently under some circumstances it may be useful for the linking bus structure to further comprise: a third connector adjacent to the first connector; a fourth connector adjacent to the second connector, a second bus bar electrically linking the third connector to the fourth connector, and at least one electrically insulative sheet disposed between the first and second bus bars.

BRIEF DESCRIPTION OF THE DRAWINGS

In order that the invention may be more clearly understood and more readily carried into effect, exemplary embodiments of the invention will now be described with reference to the accompanying drawings in which.

DETAILED DESCRIPTION

The present invention will now be described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers.

Figure 1:
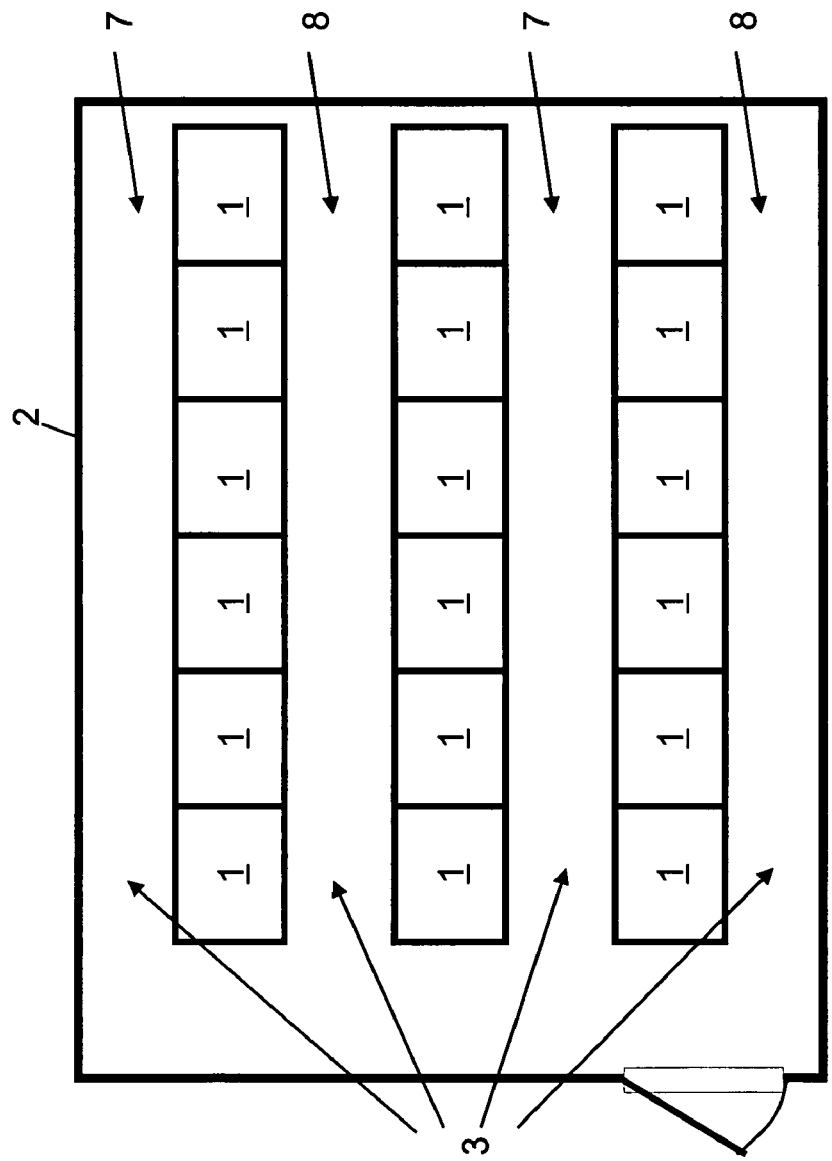
FIG. 1 is a diagram illustrating a telecom equipment room having a row of telecom equipment racks defining equipment aisles as typically found in the prior art.

Referring to FIG. 1 there is illustrated a typical telecom equipment room known in the art. Telecom equipment racks, generally denoted by reference numeral 1, stand about two meters tall (by convention) and they are typically housed in rows in a telecom equipment room which is defined by walls 2. Rows of telecom equipment racks 1 define telecom equipment aisles 3. Telecom equipment aisles 3 may be formed between two rows of telecom equipment racks 1, or between a row of telecom equipment racks 1 and a wall 2 of the telecom equipment room. Typically telecom equipment aisles 3 are further demarcated as maintenance aisles 7 and wiring aisles 8. A maintenance aisle 7 is bordered by either a wall 2 and a row of telecom equipment racks 1 or two rows of telecom equipment racks 1 such that the front or switch sides of the telecom equipment racks 1 face toward the maintenance aisle 7. A wiring aisle 8 is bordered by either a wall 2 and a row of telecom equipment racks 1 or two rows of telecom equipment racks 1 such that the rear or port sides of the telecom equipment racks 1 face toward the wiring aisle 8. It is often preferred that most telecom equipment assemblies 32 are accessed through the front or switch side of the telecom equipment rack 1 from a maintenance aisle 7.

Figure 2:
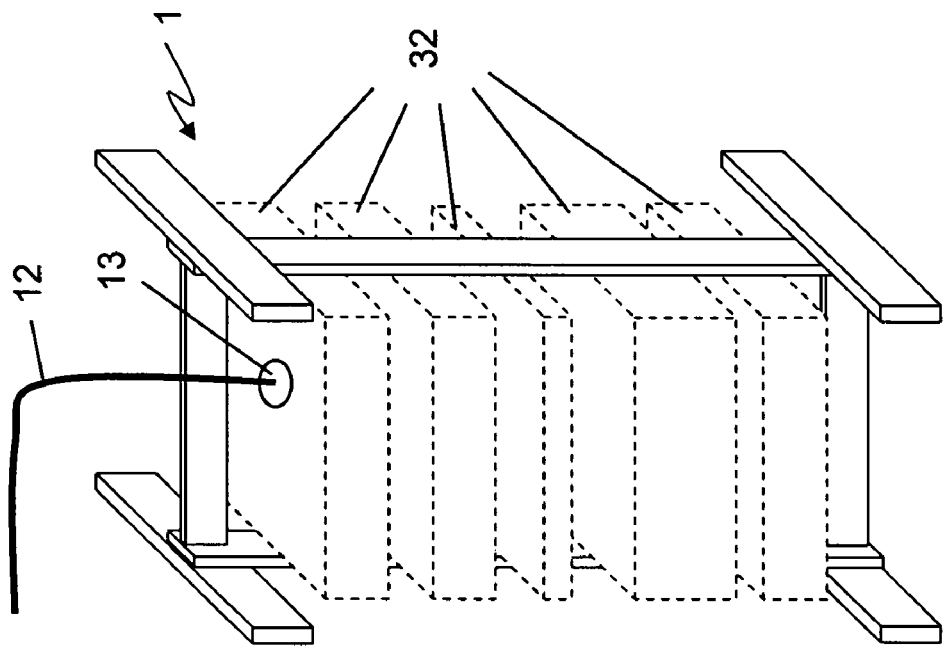
FIG. 2 is a diagram illustrating a telecom equipment rack having a power entry point located at the top of the telecom equipment assembly typically found in the prior art.

Referring now to FIG. 2 there is illustrated a typical telecom equipment rack 1 that is well known in the art. Within any telecom equipment rack 1 there are regions that are inaccessible to an operator from a telecom equipment aisle, regions that are accessible but with some difficulty to an operator from a telecom equipment aisle, and regions that are conveniently accessible to an operator from a telecom equipment aisle 3. The region containing the terminal connection of the power feeder cable 12 to the power entry point 13 in a prior art installation as depicted in FIG. 2 is accessible to an operator from an equipment aisle 3 but with some difficulty. Notably, power feeder cables 12, which eventually feed electrical power to the electrical subsystems 5, terminate at a power entry point 13 located at the top or rear of the telecom equipment rack 1. As can be seen in FIG. 2, the terminal connection of the power feeder cable 12 at the power entry point 13 of the telecom equipment assembly 32 being at the top of the telecom equipment rack 1, is located at a position that is not conveniently accessible to an operator working in the equipment aisle 3.

In this example, an operator is forced to bring a ladder or step stool into the telecom equipment aisle 3 to gain access to the top of the telecom equipment rack 1, and the connection might be further located inside of the telecom equipment assembly 32 behind access panels (not shown) which obscure the operator's view of the connection. In such cases an operator may have to find the connection by touch before he or she can conduct maintenance on the connection itself. Regions of the telecom equipment racks that are conveniently accessible to an operator from an equipment aisle are reachable by an operator from the equipment aisle without the need for ladders, stools or special tools. Furthermore, regions that are conveniently accessible to an operator from the equipment aisle 3 afford an operator an unobscured view from an equipment aisle 3. Operators that have power infrastructure in a raised or sub-floor, would run power feeder cables 12 from an opening in the raised sub-floor to the top of the telecom equipment racks 1. This uses valuable rack space for routing of the power feeder cables 12.

Figure 3:
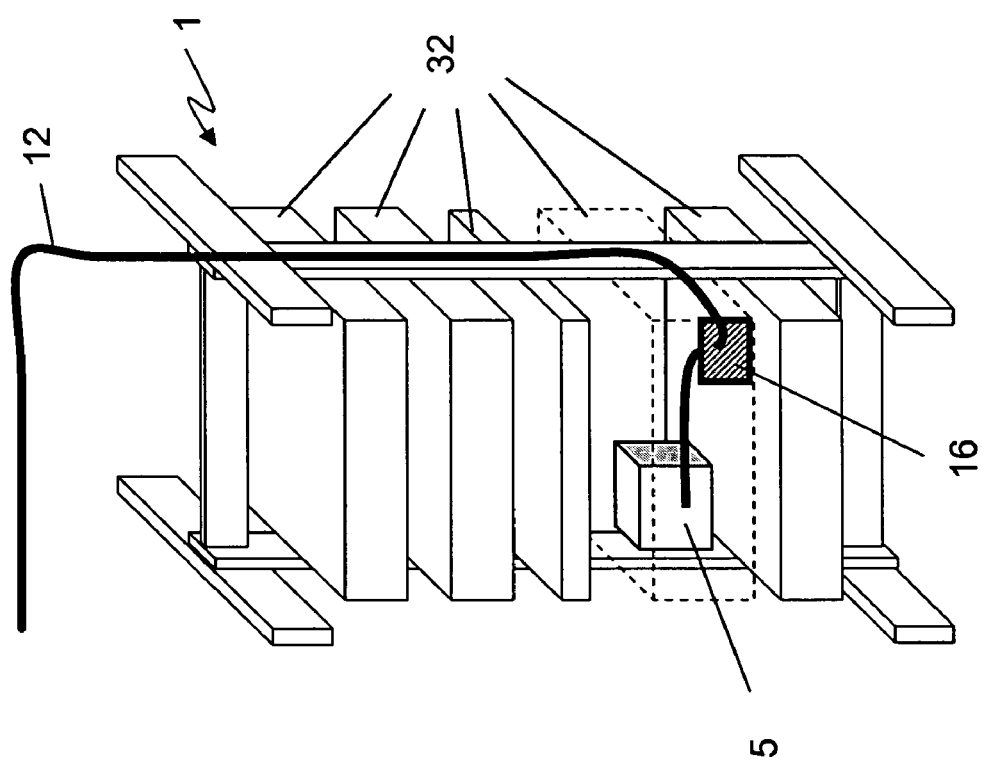
FIG. 3 is a diagram illustrating a telecom equipment rack having a power landing located at the front of the telecom equipment assembly according to an embodiment of the present invention.

According to one embodiment of the present invention illustrated in FIG. 3, a power landing 16 is positioned on a telecom equipment assembly 32 at a side portion bordering an equipment aisle 3 so that an operator can conveniently access the power landing 16 from the equipment aisle 3. The power feeder cable 12 is electrically linked to the power landing 16 and the power landing 16 is electrically linked to an electrical subsystem 5.

The power landing 16 is ideally located lower than about 2 meters from floor level of the equipment aisle 3. Such a position is conducive to convenient access to the power landing 16 by an operator from the equipment aisle 3.

A protective cover 6 may be situated in front of the power landing 16 to prevent electrical faults or injury to an operator working in the equipment aisle 3. The protective cover is constructed from an insulative material such as plastic. The protective cover 6 is mounted to the telecom equipment assembly 32 such that an operator can move it from a normally closed position to a position that provides the operator access to the power landing 16.

According to a contemplated embodiment of the invention, the first connector 18 comprises a connector having at least one lug 20 capable of accepting a nut 24. Such a first connector 16 is intended to function with a complementary connector 22, preferably an L-shaped connector, capable of admitting the lug 20. The connection between this complementary connector 22 and the first connector 18 is then secured by engaging the lug 20 with the nut 24.

The L-shaped connector 22 may be attached to the power feeder cable 12 either by crimping, fusing with solder, or other methods well known in the art. The L-shaped connector 22 is complementary to the first connector 18. For additional security, the L-shaped connector 22 may admit a plurality of lugs 20.

It is contemplated that a telecom equipment assembly 32 may be installed along an equipment aisle 3. The telecom equipment assembly 32 has a side portion that borders the equipment aisle 3. A power landing 16 is mounted proximate to this side portion at a position that allows an operator convenient access to the power landing 16 from the equipment aisle 3. Inside the telecom equipment assembly 32 there is located an electrical subsystem 5. Electrically linking the power landing 16 to the electrical subsystem 5 is a conducting path 28. The conducting path 28 can be any material capable of conducting electricity down its length, such as a copper wire, or other materials known in the art.

In some installations the conducting path 28 may be a bus bar. A bus bar is an electrical conductor that makes a common connection between several connectors. It is typically a thin flat type of conductor known in the art which has the necessary cross-sectional area necessary to preserve the electrical resistance required for the given application.

Figure 4:
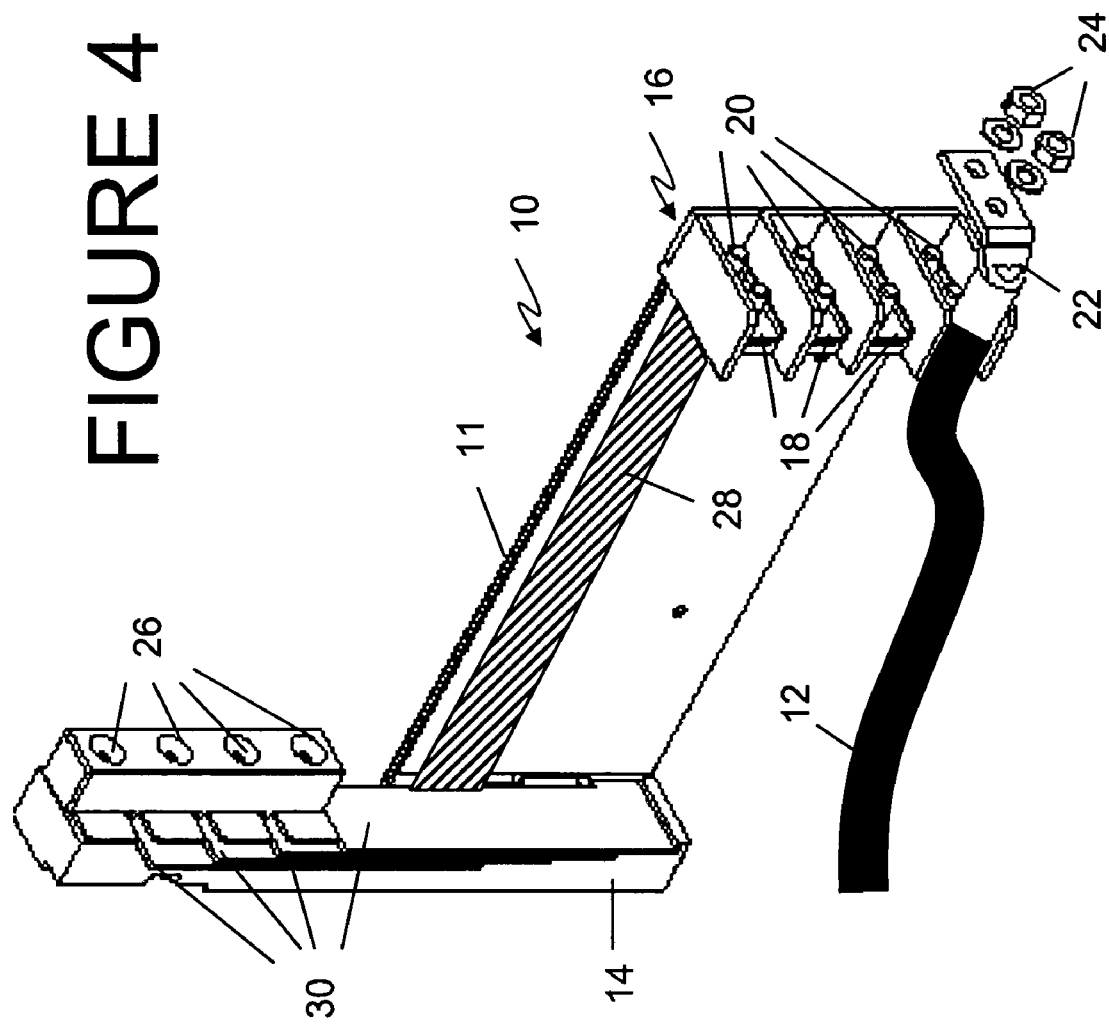
FIG. 4 is a diagram illustrating a linking bus structure according to an embodiment of the present invention.
Figure 5:
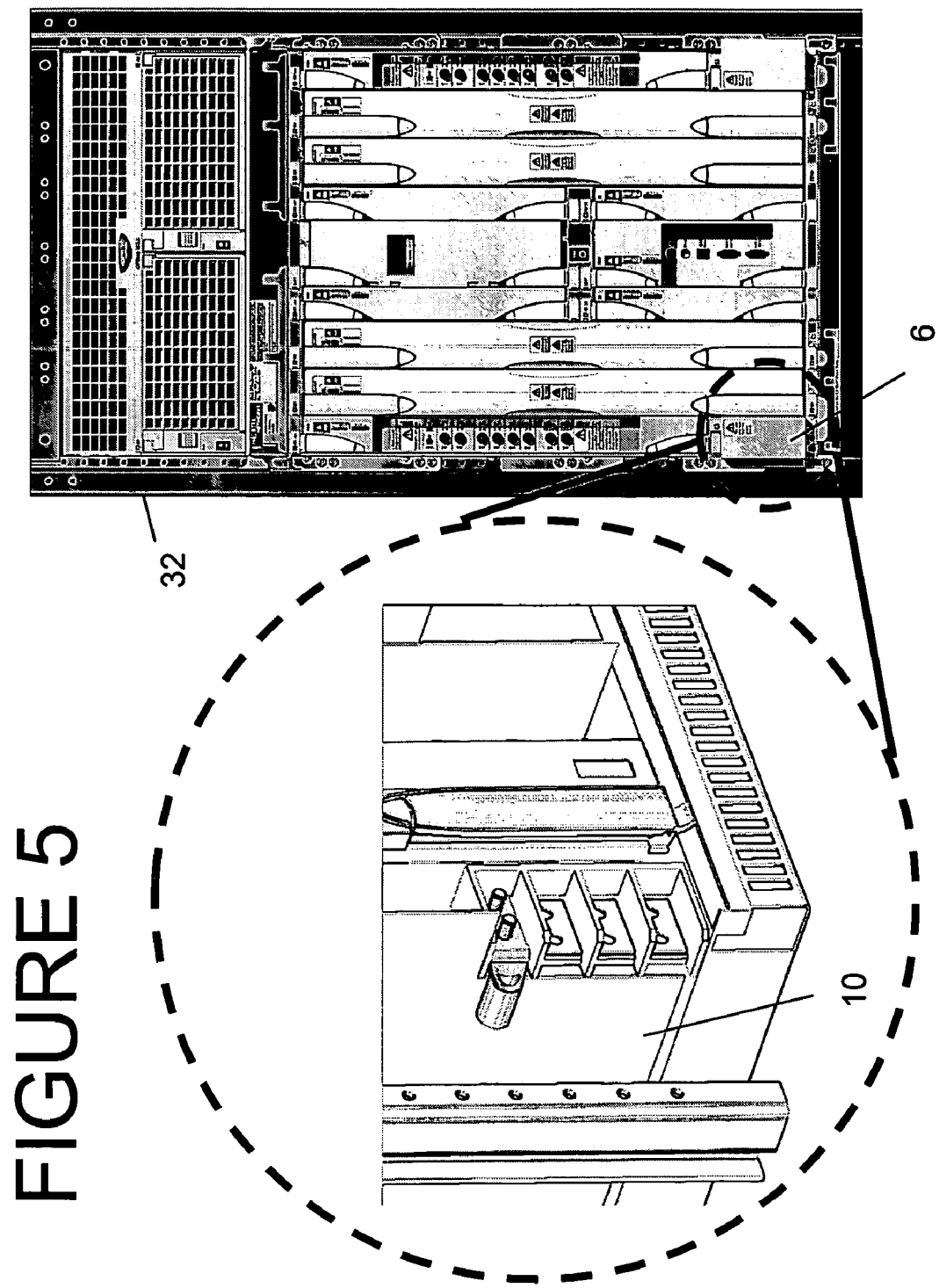
FIG. 5 is a diagram illustrating a linking bus structure mounted in a telecom equipment according to an embodiment of the present invention.

Referring now to FIGS. 4 and 5, reference numeral 10 denotes generally an embodiment of a linking bus structure for linking a power feeder cable 12 to an electrical subsystem 5 inside a telecom equipment assembly 32 such that a first connector 18 is accessible from outside of the telecom equipment assembly 32 on a side portion that borders the telecom equipment aisle 3. Referring to FIG. 4 the linking bus structure 10 is generally L-shaped. The L-shape of the linking bus structure 10 is defined by an arm 11 and a post 14 which join to resemble an L-shape. Located at the end of the arm 11 opposite the post 14 is at least one power landing 16. The power landing 16 comprises at least one first connector 18. There are four such first connectors 16 depicted in FIG. 4, each of which could admit a separate power feeder cable, however, it is to be noted that the number of first connectors 16 constituting a power landing 18 could be increased or decreased.

Attached to one end of the power feeder cable 12 is an L-shaped connector 22. The L-shaped connector 22 may be attached to the power feeder cable 12 either by crimping, fusing with solder, or other methods well known in the art. The L-shaped connector 22 is complementary to the first connector 18. The L-shaped connector 22 is secured to the first connector 18 with a nut 24 that engages the lug 20 that forms a part of the first connector 18. For additional security, the L-shaped connector 22 may admit a plurality of lugs 20.

It should be noted, however, that although only one embodiment of the first connector 16 is herein described other embodiments are contemplated by the present invention. It should be noted, however, that although only one embodiment of the power landing 16 and first connector 18 is herein described other embodiments are contemplated by the present invention. For example, first connector 18 could comprise threaded conductive bolts securing complementary connectors 22 to threaded receptacles in the power landing 16. Alternate terminal block means known to those skilled in the art are also contemplated.

Attached to the post 14 is a second connector 26 which can connect an electrical subsystem 5. A conducting path 28 runs from each power landing 16 along the arm 11 and along the post 14 to the second connector 26. The conducting path 28 may be a bus bar. A bus bar is a thin flat type of conductor known in the art. A conducting path 28 which consists of a bus bar may be used to save space inside of the telecom equipment assembly 32 by running nearly flush with the surface of the arm 11 and post 14 while maintaining the necessary cross-sectional surface area necessary to preserve the electrical resistance required for the given application.

It is contemplated that the linking bus structure 10 can comprise multiple first connectors 18 electrically link to multiple second connectors 26 through multiple bus bars 28 such that each of the first connectors 18 corresponds to a specific second connector 26.

When more than one bus bar is used as the conducting path 28, they may be mounted to the post 14 in a stacked relationship in respect of each other with an electrically insulative sheet 30 disposed therebetween. The insulative sheets 30 may be any electrically non-conductive material that can be inserted between adjacent conducting paths 28. The purpose of the insulative sheets 30 is to prevent electrical faults caused by two conducting paths 28 making contact with each other, and the insulative characteristics and dimensions must be sufficient to withstand voltage stresses as may occur between bus bars 28.

As shown in FIG. 5, the linking bus structure 10 is mounted inside of a telecom equipment assembly 32 such that the power feeder cable 12 and second connector 26 are located inside of the telecom equipment assembly 32 while the first connector 18 is accessible from outside of the telecom equipment assembly 32. A protective cover 6 may be used to cover the first connector 18 when access to the first connector 18 is not required. The purpose of the protective cover 34 is, among other things, to prevent electrical faults and inadvertent shocks to operators working in the equipment aisle 3.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed:

1. A method for electrically linking at least one power feeder cable to an electrical subsystem located inside a telecom equipment assembly, said telecom equipment assembly having a side bordering an equipment aisle, said method comprising the steps of:
    providing a power landing proximate to said side bordering an equipment aisle at a position so that an operator can conveniently access said power landing from the equipment aisle;
    electrically linking the power feeder cable to said power landing; and
    electrically linking said power landing to the electrical subsystem.

2. A method as claimed in claim 1 wherein said power landing is located behind a protective cover.

3. A method as claimed in claim 1 wherein said position of said power landing is located lower than about 2 meters from floor level of said equipment aisle.

4. A method as claimed in claim 1 wherein said power landing comprises a connector having at least one lug for accepting a nut.

5. A telecom equipment assembly for installation along an equipment aisle comprising:
    a side portion for bordering the equipment aisle;
    a power landing proximate to said side portion bordering the equipment aisle at a position so that an operator can conveniently access said power landing from the equipment aisle;
    an electrical subsystem located inside the telecom equipment assembly; and
    a conducting path electrically linking said power landing and said electrical subsystem.

6. A telecom equipment assembly as claimed in claim 5, wherein said power landing is located behind a protective cover.

7. A telecom equipment assembly as claimed in claim 5, wherein said position of said power landing is located lower than about 2 meters from floor level of said equipment aisle.

8. A telecom equipment assembly as claimed in claim 5, wherein said conducting path comprises a bus bar.

9. A telecom equipment assembly as claimed in claim 5, wherein said power landing comprises a connector having at least one lug for accepting a nut.

10. A linking bus structure for electrically connecting at least one power feeder cable to an electrical subsystem located inside a telecom equipment assembly having a side bordering an equipment aisle, said linking bus structure comprising:
    at least one first connector for electrically linking the at least one power feeder cable;
    at least one second connector for electrically linking the electrical subsystem; and
    at least one conducting path electrically linking said first and second connector;
    wherein said linking bus structure is proximate to said side bordering an equipment aisle at a position so that an operator can conveniently access said at least one first connector from the equipment aisle.

11. A linking bus structure as claimed in claim 10, wherein said first connector comprises a connector having at least one lug for accepting a nut.

12. A linking bus structure as claimed in claim 11 further comprising an L-shaped connector having a surface complementary to said first connector and an end adapted to admit said power feeder cable, said L-shaped connector being adapted to be secured to said first connector by said nut by attachment to said lug, said end of said L-shaped connector being attached to said power feeder cable.

13. A linking bus structure as claimed in claim 10 wherein said conducting path comprises a first bus bar.

14. A linking bus structure as claimed in claim 13 further comprising:
    an L-shaped support member defined by an arm and a post joined together at right angles, said L-shaped support member having a first end being an end of the arm opposite the joint, and a second end, being an end of the post opposite the joint, said L-shaped support member being adapted to attach said first connector at said first end and said second connector at said second end; and
    said first bus bar is routed along the arm and the post electrically linking said first connector to said second connector.

15. A linking bus structure as claimed in claim 13 further comprising:
    a third connector adjacent to said first connector;
    a fourth connector adjacent to said second connector;
    a second bus bar electrically linking said third connector to said fourth connector; and
    at least one electrically insulative sheet disposed between said first and said second bus bars.

* * * * *